United States Patent
Nakagawa

(10) Patent No.: US 11,936,999 B2
(45) Date of Patent: Mar. 19, 2024

(54) SOLID-STATE IMAGING ELEMENT AND CONTROL METHOD

(71) Applicant: Sony Semiconductor Solutions Corporation, Kanagawa (JP)

(72) Inventor: Haruyuki Nakagawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 80 days.

(21) Appl. No.: 17/771,816

(22) PCT Filed: Oct. 13, 2020

(86) PCT No.: PCT/JP2020/038586
§ 371 (c)(1),
(2) Date: Apr. 26, 2022

(87) PCT Pub. No.: WO2021/111738
PCT Pub. Date: Jun. 10, 2021

(65) Prior Publication Data
US 2022/0400222 A1 Dec. 15, 2022

(30) Foreign Application Priority Data
Dec. 6, 2019 (JP) ................. 2019-221202

(51) Int. Cl.
*H04N 25/59* (2023.01)
*G06N 3/02* (2006.01)
(Continued)

(52) U.S. Cl.
CPC ............ *H04N 25/59* (2023.01); *G06N 3/02* (2013.01); *H04N 25/46* (2023.01); *H04N 25/75* (2023.01); *H04N 23/84* (2023.01)

(58) Field of Classification Search
CPC ........ H04N 25/59; H04N 25/46; H04N 25/75; H04N 23/84; H04N 25/41; H04N 25/778; H04N 23/12; G06N 3/02; G06N 3/0464
See application file for complete search history.

(56) References Cited

U.S. PATENT DOCUMENTS

| 2019/0286977 | A1* | 9/2019 | Schie | H03K 3/02 |
| 2020/0244910 | A1* | 7/2020 | Ma | H04N 25/11 |
| 2022/0360727 | A1* | 11/2022 | Eki | G06N 3/02 |

FOREIGN PATENT DOCUMENTS

| JP | 6-339079 A | 12/1994 |
| JP | 2016-140109 A | 8/2016 |

(Continued)

OTHER PUBLICATIONS

International Search Report and Written Opinion dated Dec. 28, 2020, received for PCT Application PCT/JP2020/038586, filed on Oct. 13, 2020, 10 pages including English Translation.

*Primary Examiner* — Nhan T Tran
(74) *Attorney, Agent, or Firm* — XSENSUS LLP

(57) ABSTRACT

Power consumption in realizing a convolutional neural network (CNN) is reduced.
A solid-state imaging element according to the present technology includes a photoelectric conversion element that photoelectrically converts received light into signal charge corresponding to the amount of received light, a floating diffusion that holds the signal charge obtained by the photoelectric conversion element, a transfer control element that controls transfer of the signal charge from the photoelectric conversion element to the floating diffusion, and a control unit that controls application of a drive voltage to the transfer control element on the basis of a convolution coefficient in a CNN.

8 Claims, 21 Drawing Sheets

(51) Int. Cl.
   *H04N 23/84* (2023.01)
   *H04N 25/46* (2023.01)
   *H04N 25/75* (2023.01)

(56) References Cited

FOREIGN PATENT DOCUMENTS

| | | |
|---|---|---|
| JP | 2018-5639 A | 1/2018 |
| JP | 2018-125842 A | 8/2018 |

\* cited by examiner

SOLID-STATE IMAGING ELEMENT AND CONTROL METHOD

CROSS-REFERENCE TO RELATED APPLICATIONS

The present application is based on PCT tiling PCT/JPP2020/038586, filed Oct. 13, 2020, which claims priority to JP 2019-221202, filed Dec. 6, 2019, the entire contents of each are incorporated herein by reference.

TECHNICAL FIELD

The present technology relates to a solid-state imaging element and a control method, and in particular, to a technology of controlling a transfer control element used to transfer signal charge from a photoelectric conversion element to a floating diffusion.

BACKGROUND ART

There is an image classification device that inputs image data to a convolutional neural network (CNN), repeats convolutional operation and pooling processing on an image to extract a feature amount of the image, and classifies the image from the feature amount by a fully connected layer in the subsequent stage (refer to PTL 1 below, for example).

Meanwhile, PTL 2 below can also be mentioned as a related conventional technology.

CITATION LIST

Patent Literature

[PTL 1]
JP 2018-005639 A
[PTL 2]
JP 2018-125842 A

SUMMARY

Technical Problem

Here, the convolution operation is an operation of weighting and summing the values of each pixel for a pixel area having a predetermined size such as 2×2=4 pixels or 3×3=9 pixels, for example, and such convolution operation is executed while gradually shifting a target pixel area in CNN.

However, repeatedly executing the convolution operation in this way leads to an increase in the processing load, which is not desirable in terms of power consumption.

The present technology was made in view of the above circumstances, and an object of the present technology is to reduce power consumption in realizing CNN.

Solution to Problem

A solid-state imaging element according to the present technology includes a photoelectric conversion element that photoelectrically converts received light into signal charge corresponding to an amount of received light, a floating diffusion that holds the signal charge obtained by the photoelectric conversion element, a transfer control element that controls transfer of the signal charge from the photoelectric conversion element to the floating diffusion, and a control unit that controls application of a driving voltage to the transfer control element on the basis of a convolution coefficient in a convolutional neural network (CNN). Accordingly, it is possible to control a transfer amount of signal charge obtained by photoelectric conversion of the photoelectric conversion element to the floating diffusion to a transfer amount according to the convolution coefficient.

In the solid-state imaging element according to the present technology described above, a configuration in which a plurality of pixels are arranged two-dimensionally and each pixel has the photoelectric conversion element and the transfer control element, and the transfer control element of each pixel is formed in contact with the common floating diffusion for every predetermined plurality of pixels may be employed.

Accordingly, it is possible to add signal charge obtained in each pixel in the predetermined plurality of pixels in one floating diffusion.

In the solid-state imaging element according to the present technology described above, a configuration in which the floating diffusions are provided individually between pixels adjacent to each other in the vertical direction and between pixels adjacent to each other in the horizontal direction may be employed.

Accordingly, it is possible to freely determine whether the floating diffusion will be between the vertically adjacent pixels or the floating diffusion is shared between the horizontally adjacent pixels by selecting a transfer control element used for transfer in each pixel.

In the solid-state imaging element according to the present technology described above, a configuration in which a plurality of pixels are arranged two-dimensionally and each pixel has the photoelectric conversion element and the transfer control element, and the floating diffusion is provided for each pixel may be employed.

Accordingly, signal charge obtained by photoelectric conversion of the corresponding pixel is weighted according to a convolution coefficient and transferred in each floating diffusion.

In the solid-state imaging element according to the present technology described above, a configuration in which the transfer control element is configured as a transistor, and the control unit controls a driving voltage value of the transfer control element to a value based on the convolution coefficient may be employed. The amount of signal charge transferred from the photoelectric conversion element to the floating diffusion changes substantially in proportion to the voltage value of the driving voltage applied to the transfer control element.

In the solid-state imaging element according to the present technology described above, a configuration in which the control unit drives the transfer control element with alternating current and controls an effective value of the driving voltage on the basis of the convolution coefficient may be employed. Accordingly, variation in the driving voltage value is curbed.

In the solid-state imaging element according to the present technology described above, a configuration in which a plurality of transfer control elements are connected in parallel to one photoelectric conversion element, and the control unit controls which of the transfer control elements connected in parallel will be provided with the driving voltage on the basis of the convolution coefficient may be employed.

For example, when four transfer control elements are connected in parallel to one photoelectric conversion element, it is possible to reproduce multiplication by a coefficient=0.25 if only one of them is driven and used for transfer, and it is possible to reproduce multiplication by a coefficient=0.5 if only two of them are driven and used for transfer.

In the solid-state imaging element according to the present technology described above, a configuration in which the plurality of transfer control elements having different transfer capacities are connected in parallel to the one photoelectric conversion element may be employed.

For example, by connecting transfer control elements having transfer capacities corresponding to respective convolution coefficients that can be used in the kernel in parallel, and driving one of them and using it for transfer, it is possible to reproduce multiplication by one of the convolution coefficients that can be used.

In the solid-state imaging element according to the present technology described above, a configuration in which red, green, and blue pixels are arranged two-dimensionally in a predetermined order as pixels each having the photoelectric conversion element and the transfer control element, the floating diffusion is provided for each pixel, and floating diffusions are connected through wiring for every plurality of pixels of the same color.

Accordingly, it is possible to weight and add signal charge of each pixel for every plurality of pixels of the same color (e.g., every 4 pixels, and the like) with respect to each of red, green, and blue colors.

A control method according to the present technology is a control method in a solid-state imaging element including a photoelectric conversion element that photoelectrically converts received light into signal charge corresponding to the amount of received light, a floating diffusion that holds the signal charge obtained by the photoelectric conversion element, and a transfer control element that controls transfer of signal charge from the photoelectric conversion element to the floating diffusion, the control method including controlling application of a driving voltage to the transfer control element on the basis of a convolution coefficient in a convolutional neural network (CNN).

According to such a control method, the same operation as that of the solid-state imaging element described above can also be obtained.

DESCRIPTION OF EMBODIMENTS

Hereinafter, embodiments according to the present technology will be described in the following order.

<1. Overview of CNN>
<2. Configuration of signal processing device>
[2-1. Overall Configuration]
[2-2. Configuration of pixel array part]
<3. Control as embodiment>
<4. Another configuration example of pixel array part>
<5. Modified examples>
[5-5. Modified example of transfer amount control]
[5-6. Modified example of FD sharing]
[5-7. Corresponding to color image]
<6. Summary of embodiment>
<7. Present technology>
<1. Overview of CNN>

Figure 1:
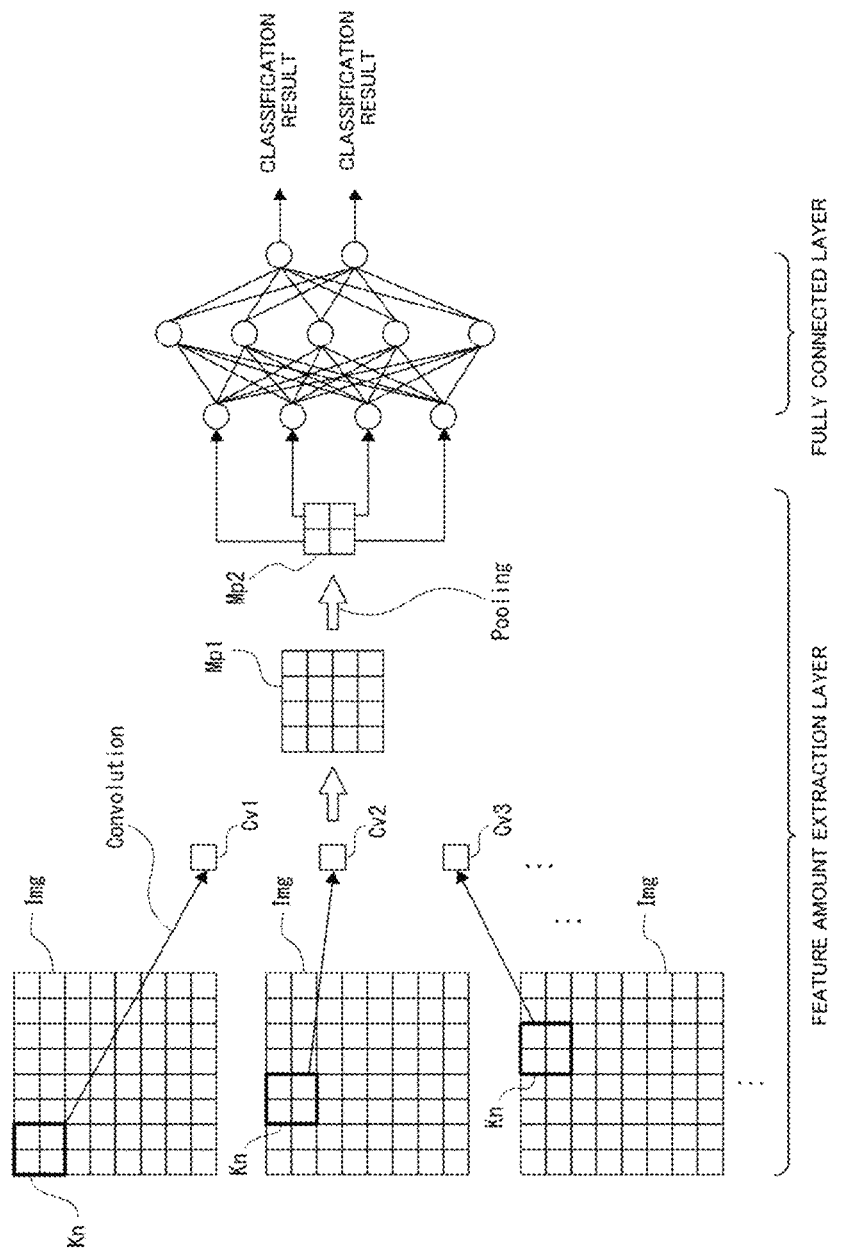
FIG. 1 is a schematic explanatory diagram of a CNN.

FIG. 1 is a schematic explanatory diagram of a convolutional neural network (CNN).

The CNN is a machine learning model in which a convolution operation and a deep neural network (DNN) are combined. As shown in FIG. 1, the CNN is roughly divided into a feature amount extraction layer in the front stage and a fully connected layer in the rear stage.

When image data Img is input, the feature amount extraction layer performs filter processing on a predetermined plurality of pixels to degenerate the image data into one pixel and performs a convolution operation to generate a feature amount map Mp1 showing a distribution of feature amounts of the image data.

Image data Img formed by a plurality of pixels arranged in a two-dimensional (matrix) is input to the CNN. For example, in the case of a 2×2 convolution operation, the CNN first applies a filter as kernel Kn to 4 upper left pixels (vertical×horizontal=2 pixels×2 pixels) in the image data Img to extract a feature amount and converts it to one degenerated pixel Cv1.

Here, the CNN calculates a feature amount of the degenerated pixel Cv1 by multiplying each pixel value of the four pixels by a convolution coefficient acquired in advance by machine learning and adding the multiplied pixel values of the four pixels (that is, performing weighted addition according to the convolution coefficient). Here, a pixel value is a value obtained by converting a voltage value corresponding to the amount of light received by a photoelectric conversion element in each pixel into a digital value.

Processing of converting a predetermined number of pixels into one degenerated pixel Cv1 including a feature amount as described above is convolution processing.

Subsequently, the CNN shifts the application position of the kernel Kn by two pixels in the horizontal direction and performs a convolution operation to convert the four pixels to which the kernel Kn has been applied into one degenerated pixel Cv2. Further, the CNN further shifts the application position of the kernel Kn by two pixels in the horizontal direction and performs a convolution operation to convert the four pixels to which the kernel Kn has been applied into one degenerated pixel Cv3. Then, the CNN performs a convolution operation on all pixels included in the image data Img to generate the feature amount map Mp1.

Thereafter, the CNN performs pooling processing on the feature amount map Mp1. In pooling processing, the CNN selects, for example, a degenerated pixel having a maximum feature amount for every predetermined number of degenerated pixels (for example, vertical×horizontal=2 pixels×2 pixels) included in the feature amount map Mp1.

Then, the CNN further extracts feature amounts according to selected degenerated pixels to generate a feature amount map Mp2, inputs the feature amount of each pixel of the feature amount map Mp2 to the fully connected layer in the rear stage, and classifies images from the feature amounts according to the fully connected layer.

As described above, in the CNN, the pixel values of all pixels of the input image data Img are multiplied by the convolution coefficient and the pixel values multiplied by the convolution coefficient are added for every predetermined number of pixels to perform convolution.

Accordingly, when image data Img of several million pixels is input to the CNN, for example, the amount of product-sum operation for performing a convolution operation becomes enormous, and the processing load increases. In addition, power consumption also increases due to increase in processing load.

Therefore, in the present embodiment, the convolution operation performed in the feature amount extraction layer in the CNN is performed through analog processing in a solid-state imaging element that captures an image, thereby reducing the processing load with respect to the convolution operation in the CNN and decreasing power consumption.

<2. Configuration of Signal Processing Device>

[2-1. Overall Configuration]

Figure 2:
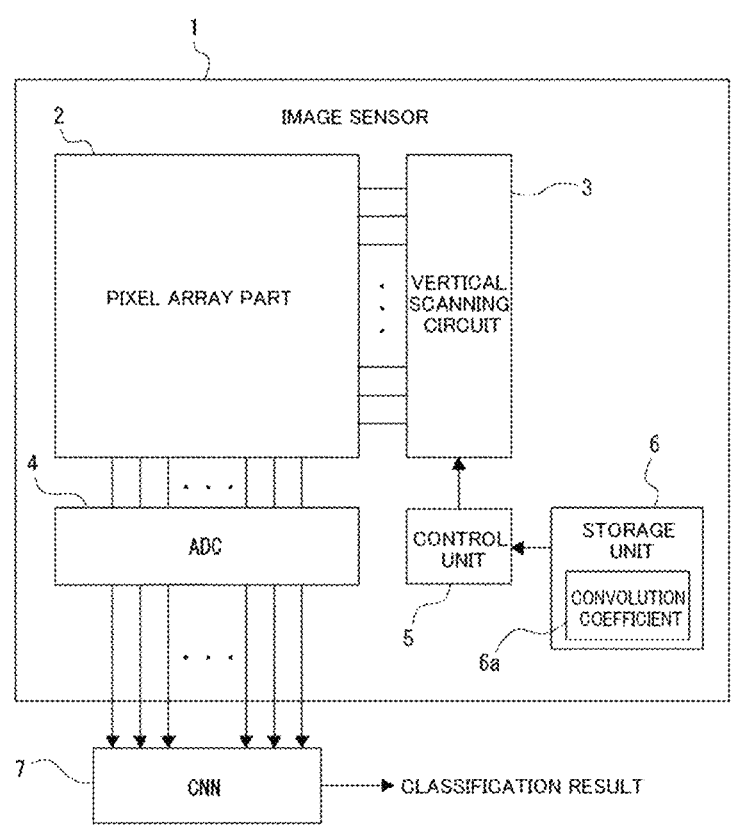
FIG. 2 is a block diagram showing a configuration example of a signal processing device including a solid-state imaging element as an embodiment.

FIG. 2 is a block diagram showing a configuration example of a signal processing device including a solid-state imaging element as an embodiment.

As illustrated, the signal processing device includes an image sensor 1 and a CNN 7. The image sensor 1 is, for example, a complementary metal oxide semiconductor (CMOS) image sensor and corresponds to a solid-state imaging element as an embodiment.

The image sensor 1 in the present embodiment performs a convolution operation of the first layer in the CNN on a captured image through analog processing. Then, the image sensor 1 outputs a signal corresponding to the result of the convolution operation to the layer of the rear stage in the CNN 7.

Accordingly, the CNN 7 can output an image classification result by performing pooling processing, convolution operations of the second and subsequent layers, and processing of a fully connected layer without performing the convolution operation of the first layer. That is, it is possible to reduce the processing load with respect to the convolution operations in the CNN 7.

The image sensor 1 includes a pixel array part 2, a vertical scanning circuit 3, an analog/digital converter (ADC) 4, a control unit 5, and a storage unit 6.

The pixel array part 2 includes a plurality of pixels Px (not illustrated in FIG. 2) arranged two-dimensionally. Each pixel Px includes a photodiode Pd as a photoelectric conversion element that photoelectrically converts received light into a signal charge corresponding to the amount of received light.

Further, the pixel array part 2 includes a floating diffusion (charge holding region) FD that temporarily holds signal charge transferred from the photodiode Pd. In the pixel array part 2 of this example, the floating diffusion FD is not provided for each pixel and is provided for every predetermined plurality of pixels. Specifically, in the pixel array part 2 of this example, one floating diffusion FD is shared by every vertical×horizontal=2×2=4 pixels.

The vertical scanning circuit 3 is controlled by the control unit 5 to perform exposure of each pixel Px, transfer of signal charge to the floating diffusion FD, reading of a pixel signal from the floating diffusion FD to the ADC 4, and the like. The ADC 4 converts an analog pixel signal input from the pixel array part 2 into a digital pixel signal and outputs the digital pixel signal to the CNN 7.

The control unit 5 includes, for example, a microcomputer having a central processing unit (CPU), a read only memory (ROM), a random access memory (RAM), and various circuits.

The storage unit 6 is, for example, a storage device such as a flash memory and stores a convolution coefficient 6a of the CNN 7 acquired in advance through machine learning.

Meanwhile, the control unit 5 may be partially or wholly composed of hardware such as an application specific integrated circuit (ASIC) or a field programmable gate array (FPGA).

Here, when the pixel array part 2 captures an image, the control unit 5 reads the convolution coefficient 6a from the storage unit 6 and controls the vertical scanning circuit 3 such that the amount of signal charge obtained by the photodiode Pd of each pixel Px transferred to the floating diffusion FD corresponds to a transfer amount according to the convolution coefficient 6a. Accordingly, it is possible to increase the amount of signal charge transferred to the floating diffusion FD as a pixel Px has a larger convolution coefficient 6a. That is, signal charge can be multiplied by a convolution coefficient for each pixel Px and held in the floating diffusion FD.

Then, since the floating diffusion FD is shared by every 4 pixels in this example, signal charge multiplied by the convolution coefficient at each pixel Px is added to every 4 pixels in the floating diffusion FD.

Such an operation is substantially the same as operation processing of adding the pixel values of a predetermined number of pixels multiplied by the convolution coefficient 6a. That is, the series of operations described above is substantially the same as convolution processing of the first layer in the CNN.

The control unit 5 sequentially reads signal charge transferred to each floating diffusion FD from the pixel array part 2 to the ADC 4 as a pixel signal. The ADC 4 converts an analog pixel signal input from the pixel array part 2 into a digital pixel signal and outputs the digital pixel signal to the CNN 7.

Accordingly, the CNN 7 can output an image classification result by performing pooling processing, convolution operations of the second and subsequent layers, and processing of a fully connected layer without performing the convolution operation of the first layer.

[2-2. Configuration of Pixel Array Part]

Figure 3:
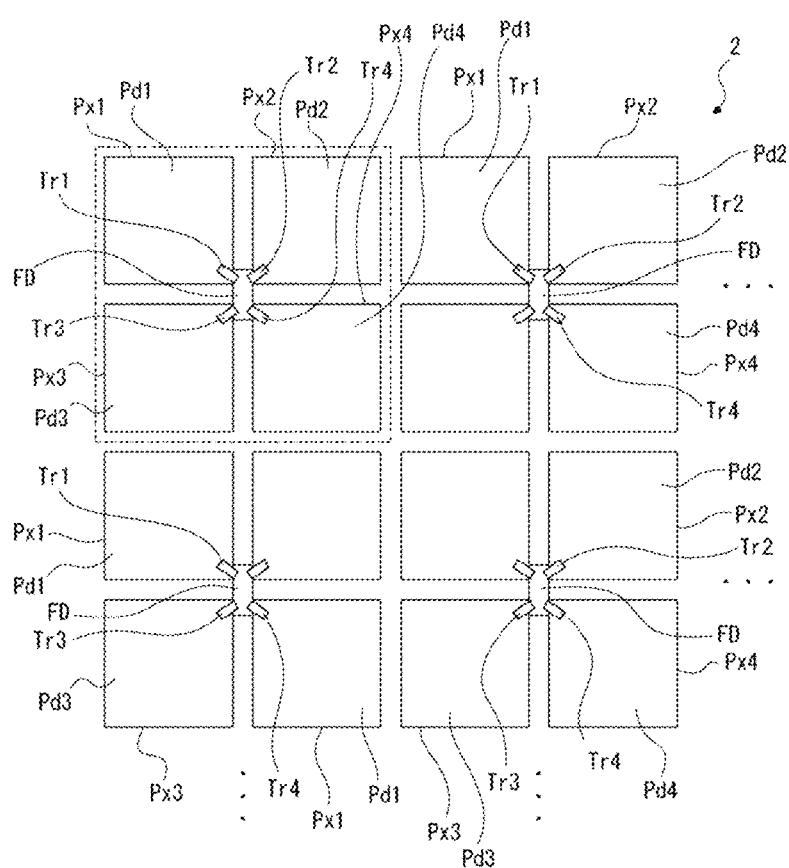
FIG. 3 is a diagram showing an example of a structure of a pixel array part in a solid-state imaging element as an embodiment.

FIG. 3 is a diagram showing an example of a structure of the pixel array part 2. Although the structure of four pixels Px that share one floating diffusion FD among the pixels Px in the pixel array part 2 is described in FIG. 3, the pixel array part 2 of this example may have a structure in which a plurality of pairs of four pixels Px sharing a floating diffusion FD are arranged two-dimensionally.

As shown in FIG. 3, a floating diffusion FD is shared by every vertical×horizontal=2×2=4 pixels in the pixel array part 2 of this example. The four pixels Px that share the floating diffusion FD in this manner are hereinafter referred to as pixels Px1, Px2, Px3, and Px4. The pixel Px1 refers to a pixel positioned at the upper left, the pixel Px2 refers to a pixel positioned at the upper right, the pixel Px3 refers to a pixel positioned at lower left, and the pixel Px4 refers to a pixel positioned at the lower right.

Further, the photodiodes Pd included in these four pixels Px are referred to as photodiodes Pd1, Pd2, Pd3, and Pd4.

Each pixel Px is provided with a transfer transistor Tr for transferring signal charge obtained by the photodiode Pd to the floating diffusion FD. The transfer transistor Tr is an aspect of a transfer control element that controls transfer of signal charge from the photoelectric conversion element to the floating diffusion. The transfer transistors Tr provided in the pixels Px1, Px2, Px3, and Px4 are distinguished from one another and are referred to as transfer transistors Tr1, Tr2, Tr3, and Tr4.

In a set of four pixels Px consisting of the pixels Px1, Px2, Px3, and Px4, the floating diffusion FD is disposed at a position surrounded by the photodiodes Pd1, Pd2, Pd3, and Pd4 in the respective pixels Px. Specifically, the floating diffusion FD is disposed at the center (vertical and horizontal center) between these four photodiodes Pd.

In addition, the transfer transistors Tr1, Tr2, Tr3, and Tr4 are disposed such that they surround the floating diffusion FD disposed at the center in this manner. Specifically, the transfer transistor Tr1 is disposed at the lower right of the pixel Px1, the transfer transistor Tr2 is disposed at the lower left of the pixel Px2, the transfer transistor Tr3 is disposed at the upper right of the pixel Px3, and the transfer transistor Tr4 is disposed at the upper left of the pixel Px4.

In addition, in the pixel array part 2 of this example, the transfer transistors Tr1, Tr2, Tr3, and Tr4 are formed in contact with the floating diffusion FD as a shared object. That is, the transfer transistors Tr1, Tr2, Tr3, and Tr4 are electrically connected to the floating diffusion FD as a shared object without using metal wiring (connected such that signal charge of the corresponding photodiodes Pd can be transferred).

Figure 4:
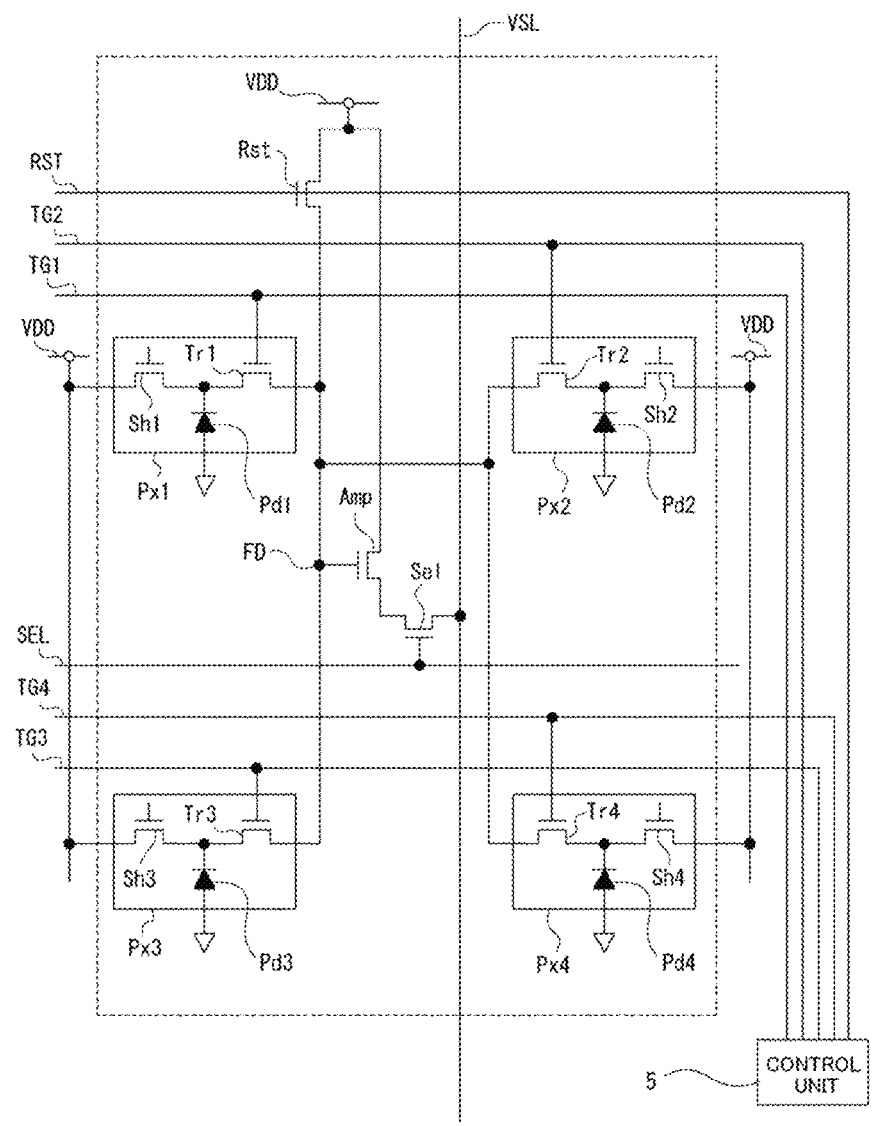
FIG. 4 is a circuit diagram for describing a circuit configuration example of a solid-state imaging element as an embodiment.

FIG. 4 is a circuit diagram for describing a circuit configuration example of the image sensor 1 including the pixel array part 2 and the vertical scanning circuit 3.

As can be ascertained with reference to FIG. 4, each pixel Px is provided with a shutter transistor Sh along with the photodiode Pd and the transfer transistor Tr. Here, in order to distinguish the shutter transistors Sh provided in the pixel Px1 to the pixel Px4, they are assigned same numbers as the endings of the signs of the corresponding pixels Px and represented as shutter transistors Sh1, Sh2, Sh3, and Sh4.

In order to accumulate signal charge in the photodiodes Pd1, Pd2, Pd3, and Pd4, first, the shutter transistors Sh1, Sh2, Sh3, and Sh4 are all turned on to reset the signal charge of the photodiodes Pd1, Pd2, Pd3, and Pd4, and then the shutter transistors Sh1, Sh2, Sh3, and Sh4 are turned off. Accordingly, accumulation of signal charge in the photodiodes Pd1, Pd2, Pd3, and Pd4 is started. Thereafter, accumulation of signal charge in the photodiodes Pd1, Pd2, Pd3, and Pd4 continues until the shutter transistors Sh1, Sh2, Sh3, and Sh4 are turned on again.

The pixels Px1, Px2, Px3, and Px4 share a reset transistor Rst, an amplification transistor Amp, a select transistor Sel, and a floating diffusion FD. Therefore, the photodiodes Pd1, Pd2, Pd3, and Pd4 are connected to the floating diffusion FD via the transfer transistors Tr1, Tr2, Tr3, and Tr4, respectively. When the reset transistor Rst is turned on in response to a reset signal RST, the floating diffusion FD is clamped to a predetermined reference potential VDD and reset. As illustrated, the reset signal RST is output from the control unit 5.

In the pixel Px1, when the transfer transistor Tr1 is turned on in response to a transfer signal TG1, signal charge photoelectrically converted by the photodiode Pd1 is transferred to the floating diffusion FD.

Similarly, in the pixels Px2, Px3, and Px4, when transfer transistors Tr2, Tr3, and Tr4 are turned on in response to transfer signals TG2, TG3, and TG4, respectively, signal charge photoelectrically converted by the photodiodes Pd2, Pd3, and Pd4 is transferred to the floating diffusion FD.

When the transfer transistors Tr1, Tr2, Tr3, and Tr4 are turned on in this manner, the signal charge photoelectrically converted in the pixels Px1, Px2, Px3, and Px4 are transferred to the floating diffusion FD. That is, the signal charge is added and accumulated in the floating diffusion FD.

As described above, the control unit 5 outputs the transfer signals TG1, TG2, TG3, and TG4 for controlling transfer of signal charge from the pixels Px1, Px2, Px3, and Px4 to the floating diffusion FD.

In the pixel array part 2, when the select transistor Sel is turned on in response to a select signal SEL, a pixel signal corresponding to signal charge accumulated in the floating diffusion FD is output to a vertical signal line VSL. At this time, the pixel signal from the floating diffusion FD is amplified by the amplification transistor Amp and output to the vertical signal line VSL.

<3. Control as Embodiment>

Figure 5:
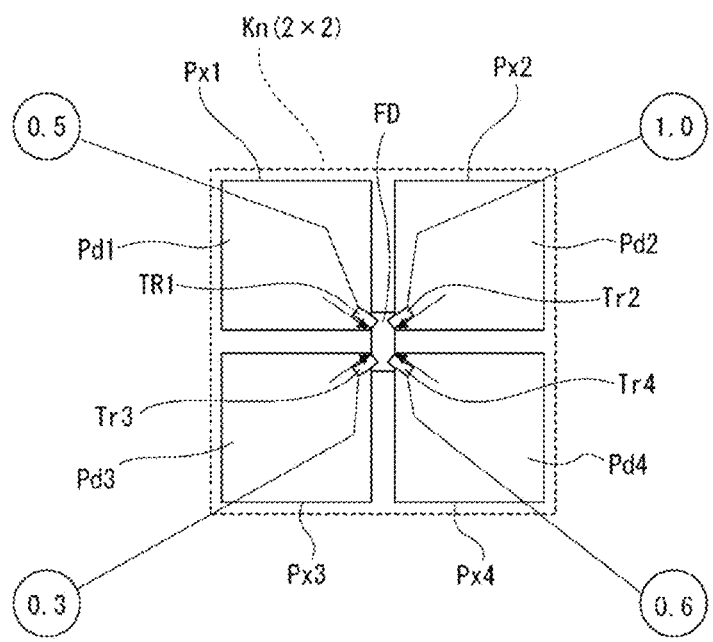
FIG. 5 is an explanatory diagram of transfer amount control as an embodiment.

FIG. 5 is an explanatory diagram of transfer amount control as an embodiment. In the pixel array part 2 of the present embodiment, 2×2=4 pixels as pixels Px1 to Px4 are regarded as one pixel unit, and a plurality of pixel units are arranged vertically and horizontally. In addition, in each pixel unit, one floating diffusion FD is shared between the pixels Px.

In addition, in the present embodiment, upon adoption of such a configuration, signal charge from each pixel Px added in the floating diffusion FD is weighted according to the convolution coefficient 6a by controlling the amount of signal charge transferred from each pixel Px of the pixels Px1, Px2, Px3, and Px4 to the floating diffusion FD. FIG. 5 shows an example in which a weight for the signal charge of the pixel Px1 is "0.5," a weight for the signal charge of the pixel Px2 is "1.0," a weight for the signal charge of the pixel Px3 is "0.3," and a weight for the signal charge of the pixel Px4 is "06."

In the present embodiment, control of the amount of transferred signal charge is realized by controlling application of a driving voltage of the transfer transistors Tr1, Tr2, Tr3, and Tr4 (that is, the transfer signals TG1, TG2, TG3, and TG4). Specifically, it is realized by controlling a driving voltage value in this example.

Here, it is possible to drive a transfer transistor Tr into a state that is neither an OFF state nor a completely ON state by controlling the voltage value of the driving voltage as a transfer signal TG. In a state in which the transfer transistor Tr is not completely turned on, a diffusion current flows from the photodiode Pd toward the floating diffusion FD. The value of this diffusion current is determined by the voltage value of the transfer signal TG.

Specifically, the value of the diffusion current is substantially proportional to the voltage value of the transfer signal TG. Therefore, it is possible to control the amount of signal charge transferred to the floating diffusion FD by controlling the voltage value of the transfer signal TG. That is, the signal charge from each pixel Px of the pixels Px1, Px2, Px3, and Px4 added in the floating diffusion FD can be weighted according to the convolution coefficient 6a.

Figure 6:
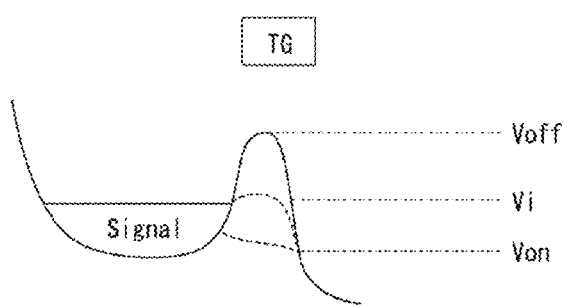
FIG. 6 is a diagram schematically showing the relationships between signal charge accumulated in a photodiode, a voltage value of a transfer signal, and charge transferred to a floating diffusion.

FIG. 6 schematically shows the relationship between signal charge accumulated in the photodiode Pd, the voltage value of the transfer signal TG, and charge transferred to the floating diffusion FD. In the figure, "Voff" and "Von" mean an OFF voltage and an ON voltage of the transfer transistor Tr, and "Vi" means an intermediate voltage value between the ON voltage and the OFF voltage (that is, a voltage value at which the above-mentioned diffusion current flows).

The control unit 5 outputs transfer signals TG depending on voltage values according to convolution coefficients 6a stored in the storage unit 6 as the transfer signals TG1, TG2, TG3, and TG4 at a timing when the signal charge of the pixels Px1, Px2, Px3, and Px4 should be transferred to the floating diffusion FD. Specifically, as the convolution coefficient 6a, convolution coefficients of the kernel Kn according to the size of 2×2=4 pixels, that is, a convolution coefficient 6a determined for each pixel position of the 4 pixels is stored in the storage unit 6 of this example, and the control unit 5 generates the transfer signals TG1, TG2, TG3, and TG4 according to the voltage values based on the convolution coefficient 6a of each pixel position and outputs the transfer signals to the transfer transistors Tr1, Tr2, Tr3, and Tr4.

Accordingly, the signal charge obtained by the pixels Px1, Px2, Px3, and Px4 is weighted according to the convolution coefficients 6a determined in the kernel Kn, and then transferred to the floating diffusion FD and added. That is, the convolution operation based on the kernel Kn is realized as analog processing in the image sensor 1.

Here, the control unit 5 controls the shutter transistors Sh1, Sh2, Sh3, and Sh4 shown in FIG. 4 in this example. The timing at which the signal charge of the pixels Px1, Px2, Px3, and Px4 should be transferred to the floating diffusion FD is the timing at which the shutter transistors Sh1, Sh2, Sh3, and Sh4 are turned off and then turned on again in control of the shutter transistors Sh described above, that is, control for accumulating signal charge in the photodiodes Pd1, Pd2, Pd3, and Pd4. That is, it is a timing (exposure end timing) at which accumulation of signal charge in each photodiode Pd is ended.

In this example, the control unit 5 controls the timing at which the shutter transistors Sh1, Sh2, Sh3, and Sh4 are turned off (exposure start timing of each photodiode Pd) and the timing at which they are turned on again (exposure end timing) after the turning-off timing to be the same timing. That is, exposure times of the pixels Px1, Px2, Px3, and Px4 coincide.

As described above, a plurality of sets of four pixels of pixels Px1, Px2, Px3, and Px4 are arranged two-dimensionally in this example. The control unit 5 executes weighted addition of signal charge of each pixel Px by controlling the same transfer signal TG with respect to each set arranged in this manner. Accordingly, the convolution operation of the first layer of the CNN for a captured image can be realized by analog processing of the image sensor 1.

Meanwhile, although the method of controlling the voltage value of the transfer signal TG has been exemplified above, it is conceivable that the voltage value is controlled when the transfer transistor TG as a transfer control element is driven by direct current as control of the voltage value. Alternatively, it is also possible to employ a configuration in which the effective value of the transfer signal TG is controlled by driving the transfer transistor TG by alternating current and adjusting the pulse density per unit time.

By controlling the effective value of the transfer voltage TG in this manner, it is possible to curb variation in the voltage value and improve the accuracy of the convolution operation.

<4. Another Configuration Example of Pixel Array Part>

Figure 7:
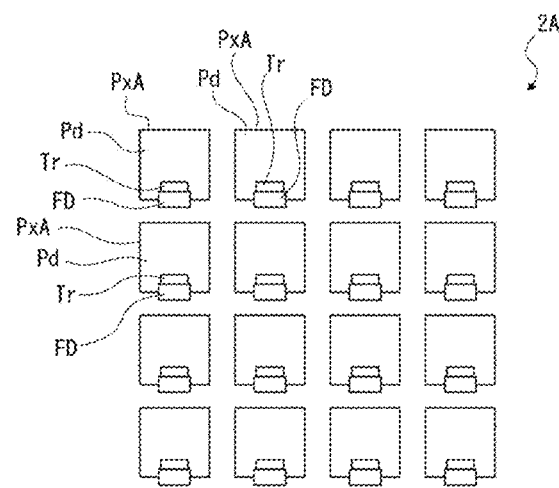
FIG. 7 is a diagram showing an example of a structure of a pixel array part in which a floating diffusion is provided for each pixel.

Although an example in which one floating diffusion FD is shared by a plurality of pixels Px has been exemplified above, a configuration in which a floating diffusion FD is provided for each pixel Px, as shown as a pixel array part 2A in FIG. 7, may be employed. In this case, the transfer transistor Tr in each pixel Px is formed in contact with the corresponding floating diffusion FD.

When the floating diffusion FD is provided for each pixel Px in this manner, a combination of pixels Px in which signal charge is weighted and added can be freely set by connecting floating diffusions FD in any combination by metal wiring. That is, the size of the kernel Kn can be set arbitrarily.

Figure 8:
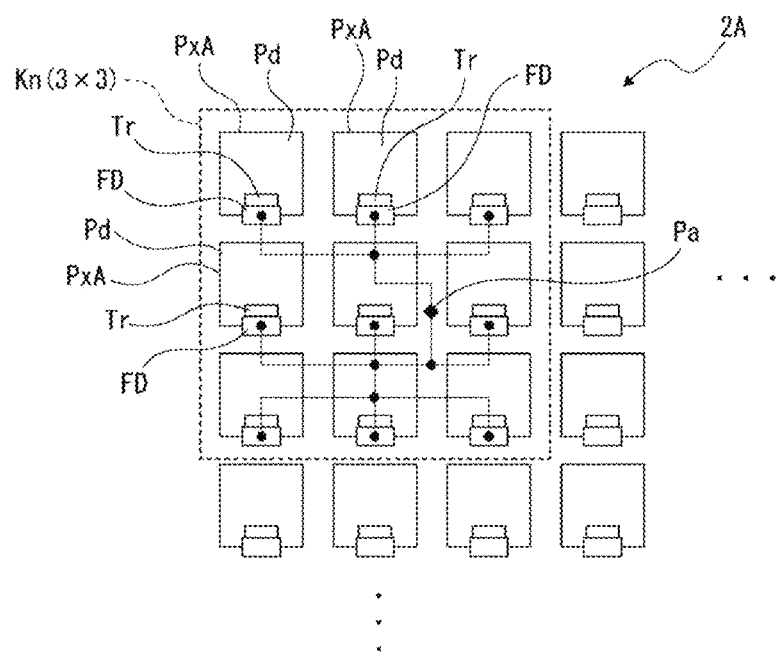
FIG. 8 is a diagram showing an example of a kernel size realized by the configuration shown in FIG. 7.
Figure 9:
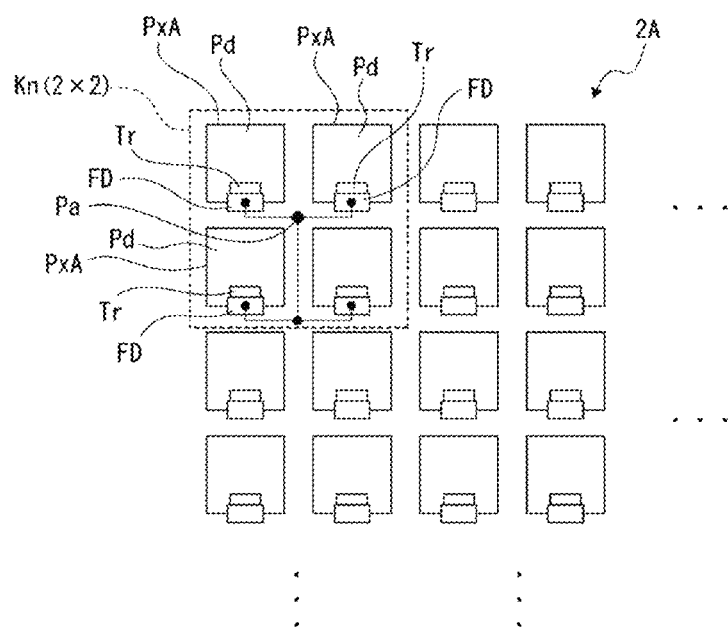
FIG. 9 is a diagram showing another example of a kernel size realized by the configuration shown in FIG. 7.

FIG. 8 and FIG. 9 show an example in which the size of the kernel Kn is set to 3×3 and an example in which the size of the kernel Kn is set to 2×2.

In the example of FIG. 8, floating diffusions FD of 3×3 pixels Px are connected to each other by metal wiring. In this case, a junction point of metal wires from the floating diffusions FD of these 3×3 pixels Px functions as an addition node Pa in the convolution operation.

In the example of FIG. 9, floating diffusions FD of 2×2 pixels Px are connected to each other by metal wiring, and in this case, a junction point of metal wires from the floating diffusions FD of the 2×2 pixels Px functions as an addition node Pa.

Figure 10:
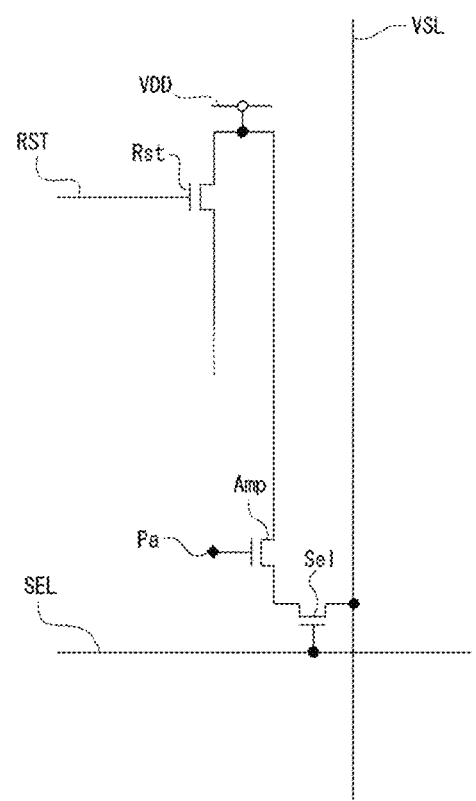
FIG. 10 is a diagram for describing a circuit configuration example of a vertical scanning circuit when a floating diffusion for each pixel is connected by metal wiring to realize a convolution operation.

FIG. 10 is a diagram for describing a circuit configuration example of the vertical scanning circuit 3 when the floating diffusion FD for each pixel Px is connected by metal wiring to realize a convolution operation.

As illustrated, in the vertical scanning circuit 3 in this case, the addition node Pa is connected to the gate of the amplification transistor Tr. Accordingly, when the select transistor Sel is turned on by the select signal SEL, a weighted addition result of signal charge of each pixel Px obtained at the addition node Pa is amplified by the amplification transistor Amp and output to the vertical signal line VSL.

<5. Modified Examples>
[5-5. Modified Example of Transfer Amount Control]

Figure 11:
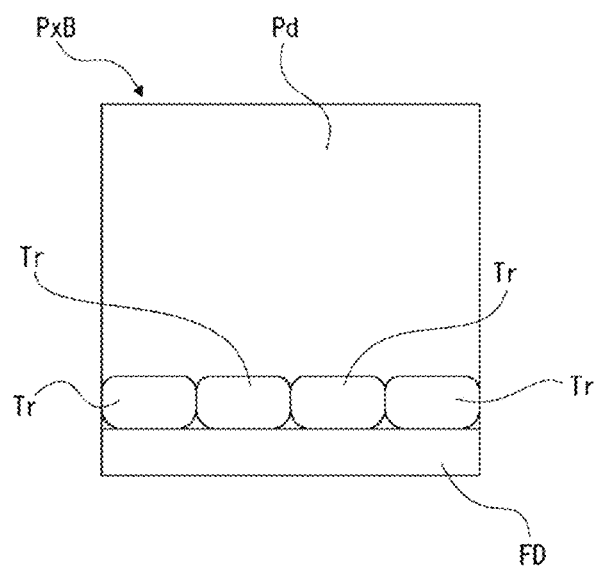
FIG. 11 is a diagram showing an example of a structure of a pixel according to a modified example of transfer amount control.

Although an example of controlling the voltage value of the transfer signal TG has been described above as an example of controlling the amount of transferred signal charge, the method of controlling a transfer amount is not limited thereto. FIG. 11 is a diagram showing an example of a structure of a pixel PxB according to a modified example of transfer amount control.

As illustrated, in the pixel PxB, a plurality of transfer transistors Tr are connected in parallel to one photodiode Pd. These transfer transistors Tr are formed in contact with a floating diffusion FD provided for each pixel PxB.

In such a structure, it is possible to reproduce multiplication of signal charge by a coefficient=0.25 by driving only one of four transfer transistors Tr and using it for transfer. Alternatively, if only two transfer transistors Tr are driven and used for transfer, multiplication of signal charge by a coefficient=0.5 can be realized.

By employing a configuration in which a plurality of transfer transistors Tr are connected in parallel to one photodiode Pd in this manner, a weight applied to signal charge can be adjusted in multiple stages by adjusting the number of transfer transistors Tr used for transfer, and thus multiplication of signal charge by a convolution coefficient can be reproduced.

Figure 12:
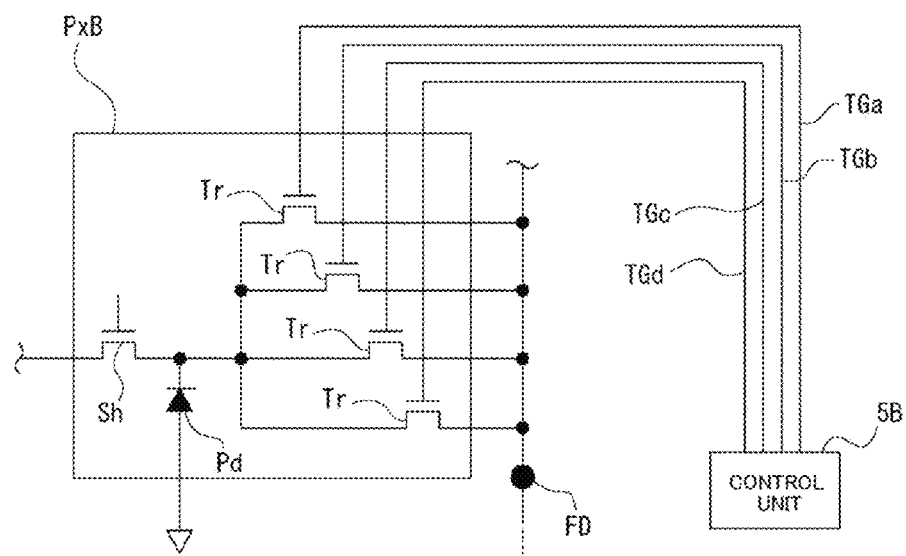
FIG. 12 is a circuit diagram for describing a circuit configuration example of a solid-state imaging element when the pixel structure shown in FIG. 11 is adopted.

FIG. 12 is a circuit diagram for describing a circuit configuration example of the image sensor 1 when the structure of the pixel PxB is adopted.

In this case, a control unit 5B is provided instead of the control unit 5. The control unit 5B is configured to be able to independently drive each transfer transistor Tr provided in the pixel Px by an individual transfer signal TG. The figure illustrates a configuration in which the control unit 5B can output transfer signals TGa, TGb, TGc, and TGd for individually driving each transfer transistor Tr in response to a case where the pixel PxB is provided with four transfer transistors Tr.

The control unit 5B controls which of the transfer transistors Tr in the pixel PxB is driven (that is, whether it is driven to be turned on) on the basis of the convolution coefficient 6a. For example, if the convolution coefficient 6a of the target pixel PxB is "0.25," only one transfer transistor Tr is driven to be turned on, and if the convolution coefficient 6a is "0.5," only the two transfer transistors Tr are driven to be turned on.

By employing a configuration in which a transfer transistor Tr used to transfer signal charge to the floating diffusion FD is selected on the basis of the convolution coefficient 6a as described above, it is possible to enhance the accuracy of the convolution operation according to improvement of stability of transfer amount control because it is not necessary to drive a transfer control element with an intermediate voltage value between the ON voltage and the OFF voltage in reproduction of coefficient multiplication.

Here, although it is assumed that transfer transistors Tr having the same transfer capacity are used as the transfer transistors Tr parallel to the photodiode Pd above, a configuration in which transfer transistors Tr having different transfer capacities are connected in parallel can also be employed. Here, different transfer capacities are synonymous with different transfer amounts of signal charge at the time of driving into the ON state.

As a method for making the transfer capacity of transfer transistors Tr different, for example, methods of changing the size of the transfer transistors Tr, changing potential states under the transfer transistors Tr, changing a gate oxide film thickness, and the like are conceivable.

For example, as transfer transistors Tr having a different transfer capacity, transfer transistors Tr having transfer capacities corresponding to convolution coefficients 6a that can be used in the kernel Kn are connected in parallel to the photodiode Pd. Accordingly, it is possible to reproduce multiplication by any of the convolution coefficients 6a that can be used by driving any of the transfer transistors Tr and using it for transfer.

Therefore, it is not necessary to drive the transfer transistors Tr with an intermediate voltage value between the ON voltage and the OFF voltage in reproduction of coefficient multiplication, and thus it is possible to enhance the accuracy of the convolution operation according to improvement of stability of transfer amount control.

[5-6. Modified Example of FD Sharing]

Figure 13:
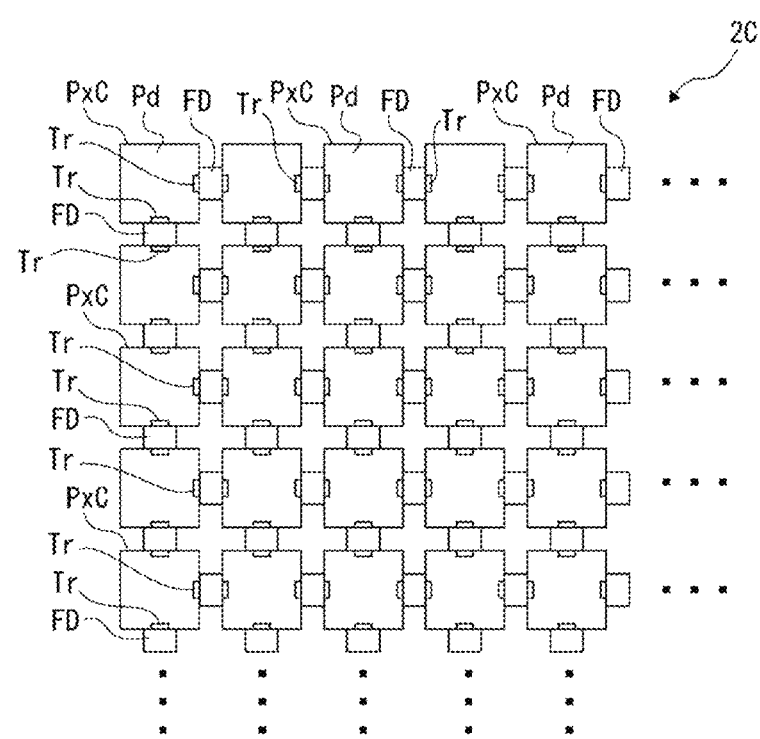
FIG. 13 is a diagram showing a configuration example of a pixel array part that enables sharing of floating diffusion between pixels adjacent to each other in the vertical direction and between pixels adjacent to each other in the horizontal direction.

Although an example in which a floating diffusion FD can be shared between pixels Px that are diagonally adjacent to each other is given as an example in which a plurality of pixels Px can share a floating diffusion FD in FIG. 3, a configuration in which a floating diffusion FD can be shared between pixels PxC adjacent to each other in the vertical direction and between pixels PxC adjacent to each other in the horizontal direction, as in a pixel array part 2C shown in FIG. 13, can also be employed.

In this case, the floating diffusion FD is provided between the pixels PxC adjacent to each other in the vertical direction and another floating diffusion FD is provided between the pixels PxC adjacent to each other in the horizontal direction. In addition, in each pixel PxC, a transfer transistor Tr formed in contact with the floating diffusion FD provided between pixels PxC adjacent to each other in the vertical direction and a transfer transistor Tr formed in contact with the floating diffusion FD provided between pixels PxC adjacent to each other in the horizontal direction are provided.

Figure 14:
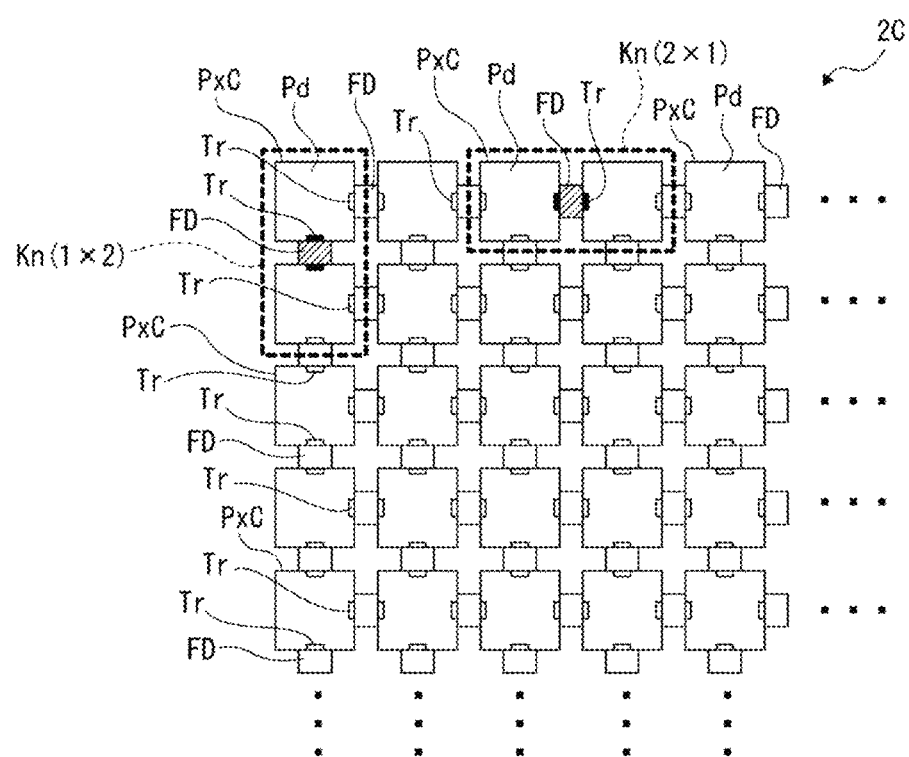
FIG. 14 is a diagram showing an example of a kernel size realized by the configuration shown in FIG. 13.

By employing the configuration of the pixel array part 2C shown in FIG. 13, it is possible to freely determine whether to share the floating diffusion FD between pixels PxC adjacent to each other in the vertical direction or between pixels PxC adjacent to each other in the horizontal direction by selecting a transfer transistor Tr used for transfer in each pixel PxC, as illustrated in FIG. 14.

At this time, when addition according to connection of the floating diffusions FD by metal wiring is not performed, the size of the kernel Kn can be set to either vertical×horizontal=2×1 or vertical×horizontal=1×2, as surrounded by broken lines in FIG. 14, by selecting a transfer transistor Tr used for transfer (in the figure, the transfer transistor Tr used for transfer is shown in black).

Figure 15:
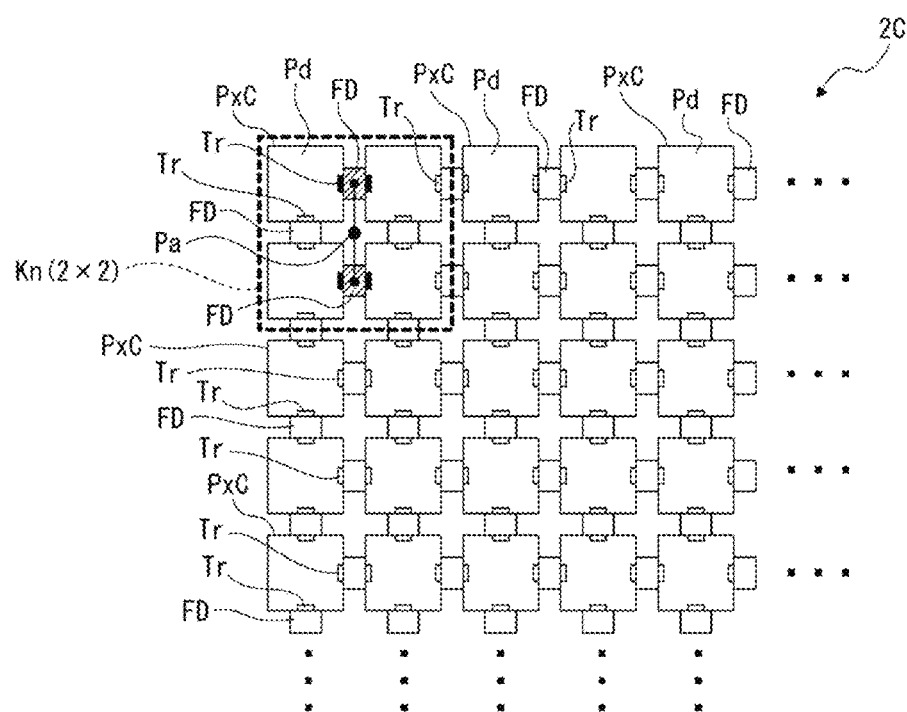
FIG. 15 is a diagram showing another example of a kernel size realized by the configuration shown in FIG. 13.
Figure 16:
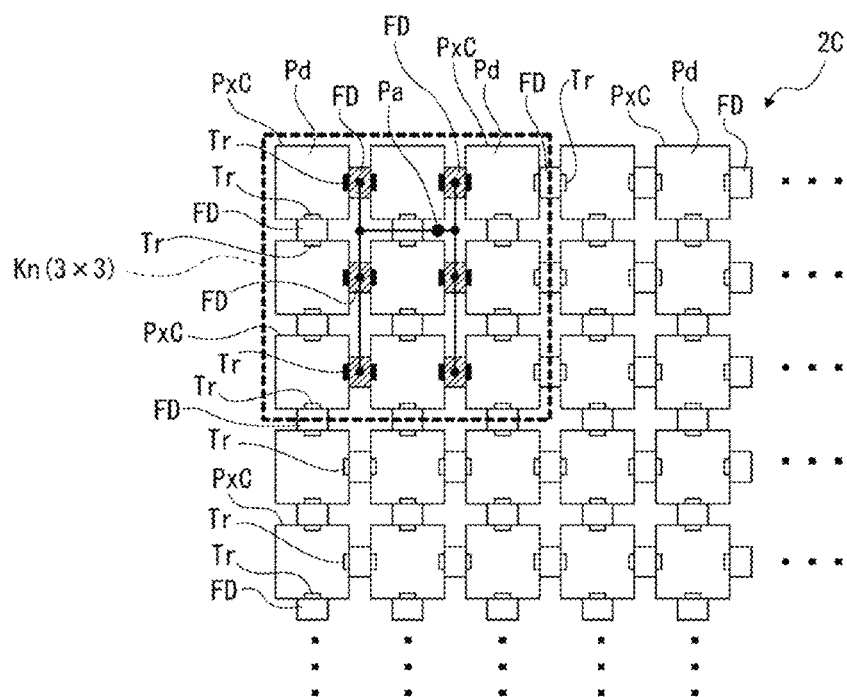
FIG. 16 is a diagram showing another example of a size of a kernel realized by the configuration shown in FIG. 13.

Alternatively, if addition according to connection of floating diffusions FD by metal wiring is performed, any size of the kernel Kn can be set, as illustrated in FIG. 15 and FIG. 16, by selecting transfer transistors Tr used for transfer. FIG. 15 shows an example of metal wiring when a 2×2 kernel Kn is realized, and FIG. 16 shows an example of metal wiring when a 3×3 kernel Kn is realized.

Figure 17:
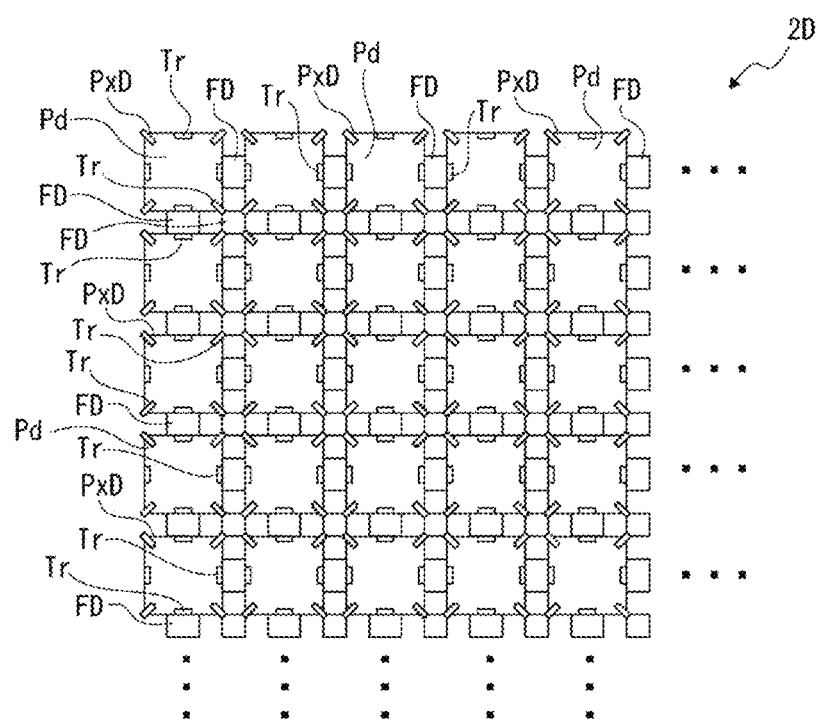
FIG. 17 is a diagram showing further another example of a size of a kernel realized by the configuration shown in FIG. 13.

Further, it is also possible to employ a configuration of a pixel array part 2D as shown in FIG. 17, in which the floating diffusion FD can be shared not only between pixels Px adjacent to each other in the vertical direction and between pixels Px adjacent to each other in the horizontal direction but also between pixels Px adjacent in a diagonal direction.

Figure 18:
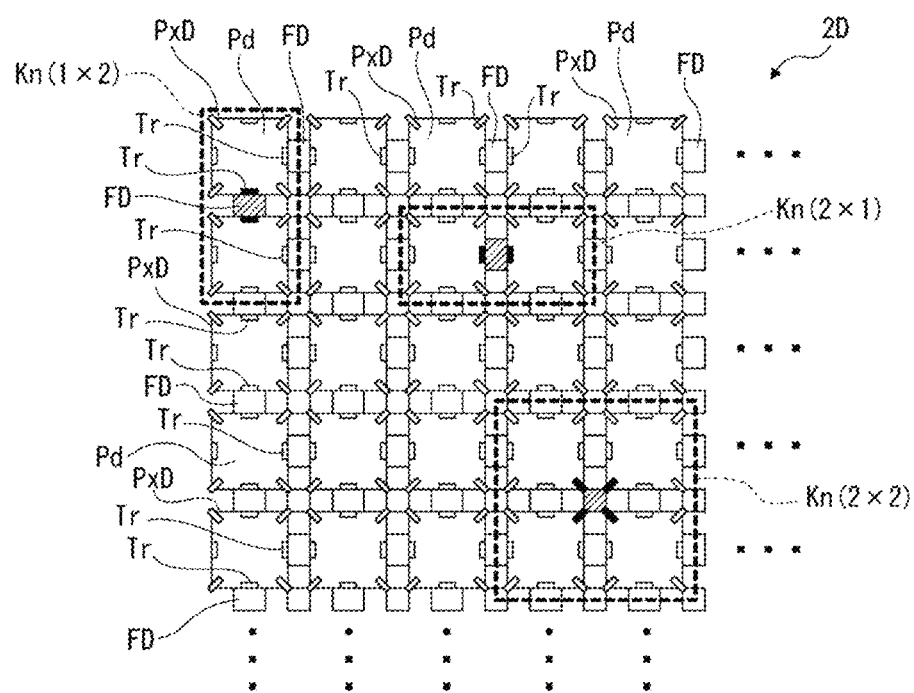
FIG. 18 is a diagram showing a configuration example of a pixel array part that enables sharing of floating diffusion between pixels that are adjacent to each other in the vertical direction, between pixels that are adjacent to each other in the horizontal direction, and between pixels that are adjacent to each other in the diagonal direction.

When such a pixel array part 2D is adopted, any of a 1×2 kernel Kn, a 2×1 kernel Kn, and a 2×2 kernel Kn can be realized without connecting floating diffusions FD by metal wiring, as illustrated in FIG. 18.

Figure 19:
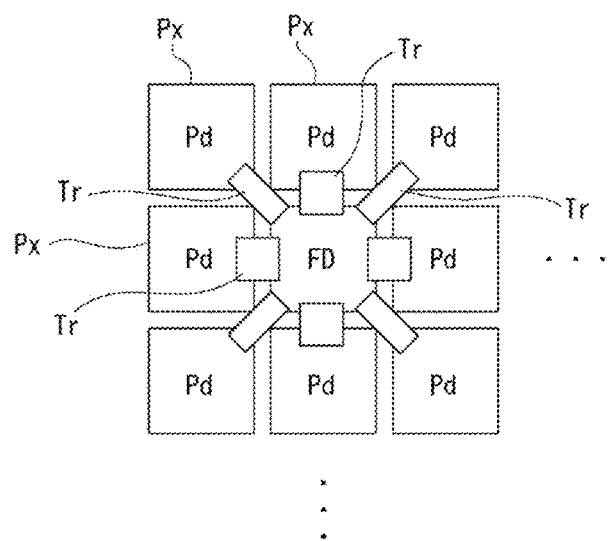
FIG. 19 is a diagram showing a configuration example of a pixel array part shared by 8 pixels.

Further, as a configuration in which a plurality of pixels Px share one floating diffusion FD, a configuration in which eight pixels share one floating diffusion FD, as illustrated in FIG. 19, is conceivable. In the pixel array part 2 in this case, the floating diffusion FD is formed in a region corresponding to the central pixel in 3×3 regions. In addition, a total of eight pixels Px vertically, horizontally, and diagonally adjacent to the central floating diffusion FD share the floating diffusion FD. That is, transfer transistors Tr in these eight pixels Px are formed in contact with the floating diffusion FD.

Figure 20:
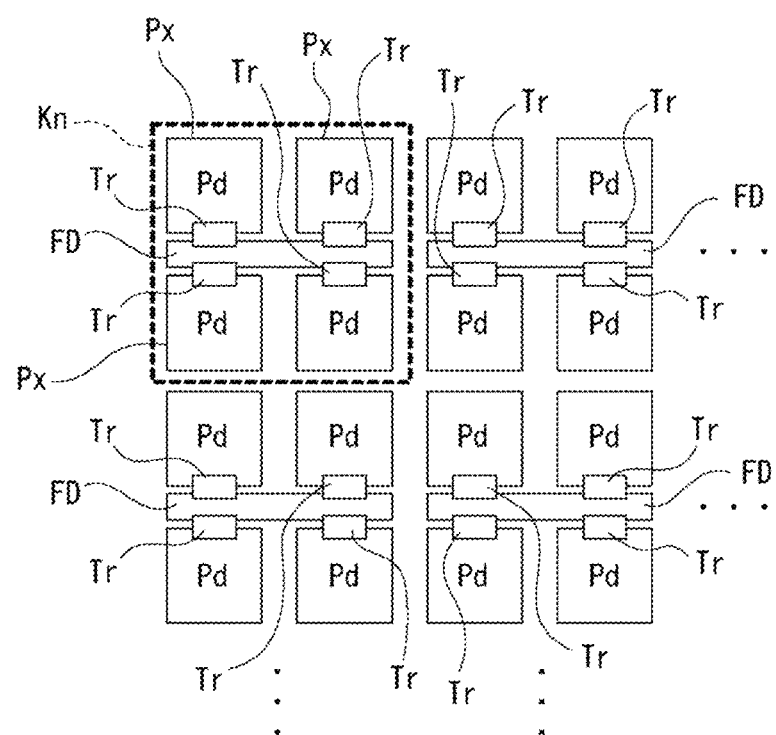
FIG. 20 is an explanatory diagram of a modified example with respect to a shape of floating diffusion.

Further, as a configuration in which a plurality of pixels Px share one floating diffusion FD, a configuration in which a horizontally long floating diffusion FD is used can also be employed, as illustrated in FIG. 20. In the example of FIG. 20, a horizontally long floating diffusion FD straddling two pixels in the horizontal direction is formed in the intermediate region between pixels in the vertical direction in 2×2 four pixel regions. Accordingly, it is possible to realize a 2×2 kernel Kn without connecting floating diffusions FD by metal wiring by employing a configuration in which transfer transistors Tr in the 2×2 pixels Px are in contact with the corresponding floating diffusion FD.

At this time, it is possible to realize a kernel Kn having a lateral size of 3 pixels or more, such as a 2×3 or 2×4 kernel Kn by forming a floating diffusion FD that straddles 3 pixels or more.

Although an example of forming a horizontally long floating diffusion FD is given in FIG. 20, the same effect can be obtained by forming a vertically long floating diffusion FD.

[5-7. Corresponding to Color Image]

The image sensor 1 may have a configuration corresponding to color imaging. In such a case, pixels Px of red (R), green (G), and blue (B) are arranged two-dimensionally in a predetermined order in the pixel array part 2. For example, in the case of a Bayer layout, 2×2=4 pixels in which pixels Px of respective colors are arranged in a predetermined order are regarded as one pixel unit, and a plurality of pixel units are arranged two-dimensionally. Specifically, in the case of the Bayer layout, array of colors in one pixel unit has the upper left pixel Px=R pixel, the upper right pixel Px=G pixel, the lower left pixel=G pixel, and the lower right pixel=B pixel.

Figure 21:
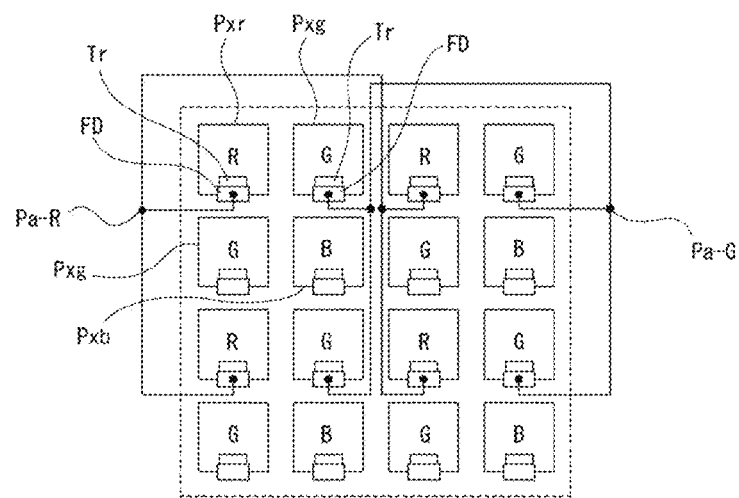
FIG. 21 is a diagram showing an example of a structure and wiring connection of a pixel array part for realizing a convolution operation corresponding to a Bayer layout.

FIG. 21 is a diagram showing an example of a structure and wiring connection of the pixel array part 2 for realizing a convolution operation corresponding to such a Bayer layout.

In FIG. 21, the R pixel is represented as a pixel Pxr, the G pixel is represented as a pixel Pxg, and the B pixel is represented as a pixel Pxb.

In the pixel array part 2 in this case, a floating diffusion FD is provided for each pixel Px, and each floating diffusion FD is in contact with a transfer transistor Tr in the corresponding pixel Px.

In this case, the floating diffusions FD are connected by metal wiring for a plurality of pixels Px of the same color. The figure shows an example in which pixel regions (4×4 pixel regions) in which pixel units each consisting of 4 pixels of RGGB are arranged vertically×horizontally=2×2 are set as a unit region, and floating diffusions FD of four pixels Pxr (R pixels) are connected by metal wiring and floating diffusions FD of four pixels Pxg (G pixels) are connected by metal wiring. Accordingly, a weighted addition result of signal charge of the four pixels Pxr in the unit region can be obtained at an addition node Pa-R in the figure with respect to the R pixels, and a weighted addition result of signal charge of the four pixels Pxg in the unit region can be obtained at an addition node Pa-G in the figure with respect to the G pixels. Although not shown, in this case, the floating diffusions FD of the four pixels Pxb of the same color in the unit region are connected by metal wiring in the same manner, the connection point of the floating diffusions FD is regarded as an addition node Pa-B, and a weighted addition result of signal charge of the pixels Pxb in the unit region is obtained with respect to the B pixels.

As described above, when a configuration in which 2×2 pixel units are set as a unit region and addition of the same color is performed within the unit region is employed, a value corresponding to a weighted addition result according to a 2×2 size kernel Kn when one pixel unit (2×2=4 pixels) is regarded as one pixel region can be obtained at the addition node Pa-R for the R pixels. That is, it is a value corresponding to a weighted addition result for the region of 2×2=4 pixels in an R image.

Similarly, a value corresponding to a weighted addition result for a region of 2×2=4 pixels in a G image and a value corresponding to a weighted addition result for a region of 2×2=4 pixels in a B image can be obtained at the addition node Pa-G with respect to the G pixels and the addition node Pa-B with respect to the B pixels, respectively.

Therefore, it is possible to obtain the same results as a convolution operation result of the first layer for an R image, a convolution operation result of the first layer for a G image, and a convolution operation result of the first layer for a B image by performing addition of the same color for each unit region.

As for the G pixels, the floating diffusions FD of all the pixels Pxg in the unit region may be connected by wiring. Alternatively, the floating diffusions FD on the upper right side and the floating diffusions FD on the lower left side may be individually connected by wiring.

Further, although the unit region is a region of four pixel units (2 pixel units×2 pixel units) in the above, the unit region can also be a larger region than the 2 pixel units×2 pixel units.

<6. Summary of Embodiment>

As described above, the solid-state imaging element (image sensor 1) as an embodiment includes a photoelectric conversion element (photodiode Pd) that photoelectrically converts received light into signal charge corresponding to the amount of received light, a floating diffusion (FD) that holds the signal charge obtained in by the photoelectric conversion element, a transfer control element (transfer transistor Tr) that controls transfer of the signal charge from the photoelectric conversion element to the floating diffusion, and a control unit (5, 5B) that controls application of a driving voltage to the transfer control element on the basis of a convolution coefficient in a CNN.

Accordingly, it is possible to control a transfer amount of signal charge obtained by photoelectric conversion of a photoelectric conversion element to a floating diffusion to a transfer amount according to a convolution coefficient.

Therefore, signal charge obtained by the photoelectric conversion element in each pixel can be added to signal charge of another pixel after being weighted according to the convolution coefficient, and thus the convolution operation in a CNN can be performed through analog processing in a solid-state imaging element.

Since the convolution operation can be realized through analog processing of the solid-state imaging element, it is possible to reduce power consumption and improve the processing speed in realizing a CNN. This is because the power and speed required for the convolution operation in this case are the same power and speed as in a case where signal charge is normally read in the solid-state imaging element.

Further, in the solid-state imaging element as an embodiment, a plurality of pixels (Px) each having a photoelectric conversion element and a transfer control element are arranged two-dimensionally, and the transfer control element of each pixel is formed in contact with a common floating diffusion for every predetermined plurality of pixels.

Accordingly, it is possible to add signal charges obtained in each pixel in a predetermined plurality of pixels in one floating diffusion.

Although it is necessary to draw out wiring for addition from each pixel for weighted addition when a floating diffusion is provided for each pixel, the transfer control element of each pixel is formed in contact with the floating diffusion in a plurality of pixels as described above, and thus it is not necessary to draw out wiring from each pixel in that way, and the number of wires can be reduced.

Further, in the solid-state imaging element as an embodiment, the floating diffusion is provided between pixels adjacent to each other in the vertical direction and another floating diffusion is provided between pixels adjacent to each other in the horizontal direction.

Accordingly, it is possible to freely determine whether the floating diffusion is shared between the vertically adjacent pixels or the floating diffusion is shared between the horizontally adjacent pixels by selecting a transfer control element used for transfer in each pixel.

Therefore, when addition according to connection of floating diffusions by wiring is not performed, the kernel size can be set to either vertical×horizontal=2×1 or vertical×horizontal=1×2 by selecting a transfer control element used for transfer. Alternatively, if addition according to connection of floating diffusions by wiring is performed, an arbitrary kernel size can be set by selecting a transfer control element used for transfer.

Furthermore, in the solid-state imaging element as an embodiment, a plurality of pixels each having a photoelectric conversion element and a transfer control element are arranged two-dimensionally, and a floating diffusion is provided for each pixel.

Accordingly, signal charge obtained by photoelectric conversion of the corresponding pixel is weighted according to a convolution coefficient and transferred in each floating diffusion.

Therefore, the kernel size can be set arbitrarily by setting a wiring connection pattern in which floating diffusions are connected by wiring.

In addition, as a semiconductor structure, a general structure in which a floating diffusion is formed for each pixel can be adopted, and thus the existing manufacturing process can be followed and cost increase can be curbed.

Further, in the solid-state imaging element as an embodiment, the transfer control element is configured as a transistor, and the control unit controls the driving voltage value of the transfer control element to a value based on the convolution coefficient.

The amount of signal charge transferred from the photoelectric conversion element to the floating diffusion changes substantially in proportion to the voltage value of the driving voltage applied to the transfer control element. Therefore, according to the above configuration, it is possible to reproduce multiplication of signal charge obtained by photoelectric conversion by the convolution coefficient.

Further, in the solid-state imaging element as an embodiment, the control unit drives the transfer control element with alternating current and controls the effective value of the driving voltage on the basis of the convolution coefficient. Accordingly, variation in the driving voltage value is curbed.

Therefore, it is possible to improve the accuracy of the convolution operation.

Furthermore, in the solid-state imaging element as an embodiment, a plurality of transfer control elements are connected in parallel to one photoelectric conversion element, and the control unit (5B) controls which of the transfer control elements connected in parallel will be provided with the driving voltage on the basis of the convolution coefficient.

For example, when four transfer control elements are connected in parallel to one photoelectric conversion element, it is possible to reproduce multiplication by a coefficient=0.25 if only one of them is driven and used for transfer, and it is possible to reproduce multiplication by coefficient=0.5 if only two of them are driven and used for transfer.

Since it is not necessary to drive transfer control elements with an intermediate voltage value between the ON voltage and the OFF voltage in reproduction of coefficient multiplication, it is possible to improve the accuracy of the convolution operation by improving stability of transfer amount control.

Further, in the solid-state imaging element as an embodiment, a plurality of transfer control elements having different transfer capacities are connected in parallel to one photoelectric conversion element.

For example, by connecting transfer control elements having transfer capacities corresponding to respective convolution coefficients that can be used in the kernel in parallel, and driving one of them and using it for transfer, it is possible to reproduce multiplication by one of the convolution coefficients that can be used. Therefore, it is not necessary to drive transfer control elements with an intermediate voltage value between the ON voltage and the OFF voltage in reproduction of coefficient multiplication, and thus it is possible to improve the accuracy of the convolution operation by improving stability of transfer amount control.

Further, in the solid-state imaging element as an embodiment, red, green, and blue pixels are arranged two-dimensionally in a predetermined order as pixels each having a photoelectric conversion element and a transfer control element, a floating diffusion is provided for each pixel, and floating diffusions are connected by wiring for every plurality of pixels of the same color.

Accordingly, it is possible to weight and add signal charge of each pixel for every plurality of pixels of the same color (e.g., every 4 pixels, and the like) with respect to each of red, green, and blue colors.

Therefore, it is possible to obtain the same result as a result of performing the convolution operation of the first layer in a CNN for each of a red image, a green image, and a blue image, and it is possible to realize image recognition processing based on a color image. As a result, the recognition performance can be improved as compared to a case where image recognition processing based on a monochrome image is performed.

A control method as an embodiment is a control method in a solid-state imaging element including a photoelectric conversion element that photoelectrically converts received light into signal charge corresponding to the amount of received light, a floating diffusion that holds the signal charge obtained by the photoelectric conversion element, and a transfer control element that controls transfer of the signal charge from the photoelectric conversion element to the floating diffusion, the control method including controlling application of a driving voltage to the transfer control element on the basis of a convolution coefficient in a CNN.

According to such a control method as an embodiment, the same operation and effect as those of the solid-state imaging element as the above-described embodiment can also be obtained.

The advantageous effects described in the present specification are merely exemplary and are not limited, and other advantageous effects may be obtained.

<6. Present Technology>

Meanwhile, the present technology can employ the following configurations.

(1)
A solid-state imaging element including a photoelectric conversion element that photoelectrically converts received light into signal charge corresponding to an amount of received light,
a floating diffusion that holds the signal charge obtained by the photoelectric conversion element,
a transfer control element that controls transfer of the signal charge from the photoelectric conversion element to the floating diffusion, and
a control unit that controls application of a driving voltage to the transfer control element on the basis of a convolution coefficient in a convolutional neural network (CNN).

(2)
The solid-state imaging element according to (1), wherein a plurality of pixels are arranged two-dimensionally and each pixel has the photoelectric conversion element and the transfer control element, and
the transfer control element of each pixel is formed in contact with the common floating diffusion for every predetermined plurality of pixels.

(3)
The solid-state imaging element according to (2), wherein the floating diffusions are individually provided between pixels adjacent to each other in a vertical direction and between pixels adjacent to each other in a horizontal direction.

(4)
The solid-state imaging element according to (1), wherein a plurality of pixels are arranged two-dimensionally and each pixel has the photoelectric conversion element and the transfer control element, and the floating diffusion is provided for each pixel.

(5)
The solid-state imaging element according to any one of (1) to (4), wherein the transfer control element is configured as a transistor, and
the control unit controls a driving voltage value of the transfer control element to a value based on the convolution coefficient.

(6)
The solid-state imaging element according to any one of (1) to (4), wherein the control unit drives the transfer control element with alternating current and controls an effective value of the driving voltage on the basis of the convolution coefficient.

(7)
The solid-state imaging element according to any one of (1) to (4), wherein a plurality of the transfer control elements are connected in parallel to one photoelectric conversion element, and
the control unit controls which of the transfer control elements connected in parallel will be provided with the driving voltage on the basis of the convolution coefficient.

(8)
The solid-state imaging element according to (7), wherein the plurality of transfer control elements having different transfer capacities are connected in parallel to the one photoelectric conversion element.

(9)
The solid-state imaging element according to any one of (1) or (4) to (8), wherein red, green, and blue pixels are arranged two-dimensionally in a predetermined order as pixels each having the photoelectric conversion element and the transfer control element,
the floating diffusion is provided for each pixel, and
the floating diffusions are connected by wiring for every plurality of pixels of the same color.

REFERENCE SIGNS LIST

1 Image sensor
2, 2A, 2B, 2C, 2D Pixel array part
3 Vertical scanning circuit
4 ADC
5, 5B Control unit
6 Storage unit
6a Convolution coefficient
Px (Px1, Px2, Px3, Px4), PxB, PxC, PxD, Pxr, Pxg, Pxb Pixel
Pd (Pd1, Pd2, Pd3, Pd4) Photodiode
Sh (Sh1, Sh2, Sh3, Sh4) Shutter transistor
Tr (Tr1, Tr2, Tr3, Tr4) Transfer transistor
Rst Reset transistor
FD Floating diffusion
Amp Amplification transistor
Sel Select transistor
TG (TG1, TG2, TG3, TG4) Transfer signal
VDD Reference potential
Pa, Pa-R, Pa-G Addition node

The invention claimed is:

1. A solid-state imaging device comprising:
photoelectric conversion elements that photoelectrically convert received light into signal charge corresponding to an amount of the received light,
floating diffusions that hold the signal charge obtained by the photoelectric conversion elements,
transfer control elements that control transfer of the signal charge from the photoelectric conversion elements to the floating diffusions, and
control circuitry configured to control application of driving voltages to the transfer control elements on the basis of convolution coefficients in a convolutional neural network (CNN), wherein
the control circuitry is further configured to drive the transfer control elements with alternating current and control effective values of the driving voltages on the basis of the convolution coefficients.

2. The solid-state imaging device according to claim 1, wherein
a plurality of pixels is arranged two-dimensionally and each of the plurality of pixels has one of the photoelectric conversion elements and at least one of the transfer control elements, and
each of the floating diffusions is formed in contact with a predetermined plural number of the transfer control elements.

3. The solid-state imaging device according to claim 1, wherein
a plurality of pixels is arranged two-dimensionally and each of the plurality of pixels has a corresponding one of the photoelectric conversion elements and at least one of the transfer control elements, and
a corresponding one of the floating diffusions is provided for each of the plurality of pixels.

4. The solid-state imaging device according to claim 1, wherein
the transfer control elements are configured as transistors, and
the control circuitry is further configured to control driving voltage values of the transfer control elements to values based on the convolution coefficients.

5. The solid-state imaging device according to claim 1, wherein
red, green, and blue pixels are arranged two-dimensionally in a predetermined order as pixels each having a corresponding one of the photoelectric conversion elements and at least one of the transfer control elements,
a corresponding one of the floating diffusions is provided for each of the pixels, and
the floating diffusions are connected by wiring for every plural number of the pixels of the same color.

6. A solid-state imaging device comprising:
photoelectric conversion elements that photoelectrically convert received light into signal charge corresponding to an amount of the received light,
floating diffusions that hold the signal charge obtained by the photoelectric conversion elements,
transfer control elements that control transfer of the signal charge from the photoelectric conversion elements to the floating diffusions, and
control circuitry configured to control application of driving voltages to the transfer control elements on the basis of convolution coefficients in a convolutional neural network (CNN), wherein
a plurality of pixels is arranged two-dimensionally and each of the plurality of pixels has a corresponding one of the photoelectric conversion elements and at least one of the transfer control elements,
each of the floating diffusions is formed in contact with a predetermined plural number of the transfer control elements, and
the floating diffusions are individually provided between pixels adjacent to each other in a vertical direction and between pixels adjacent to each other in a horizontal direction.

7. A solid-state imaging device comprising:
photoelectric conversion elements that photoelectrically convert received light into signal charge corresponding to an amount of the received light,
floating diffusions that hold the signal charge obtained by the photoelectric conversion elements,
transfer control elements that control transfer of the signal charge from the photoelectric conversion elements to the floating diffusions, and
control circuitry configured to control application of a driving voltage to the transfer control elements on the basis of convolution coefficients in a convolutional neural network (CNN), wherein
a plurality of the transfer control elements is connected in parallel to one photoelectric conversion element, and
the control circuitry is further configured to control which of the transfer control elements connected in parallel will be provided with the driving voltage on the basis of the convolution coefficients.

8. The solid-state imaging device according to claim 7, wherein the plurality of the transfer control elements connected in parallel to the one photoelectric conversion element have different transfer capacities.

\* \* \* \* \*